United States Patent
Dang et al.

(10) Patent No.: US 11,081,088 B2
(45) Date of Patent: Aug. 3, 2021

(54) IMAGE DISPLAY METHOD, APPARATUS, AND TERMINAL DEVICE

(71) Applicant: HUAWEI TECHNOLOGIES CO., LTD., Guangdong (CN)

(72) Inventors: Maochang Dang, Shanghai (CN); Yuxiang Fu, Shenzhen (CN); Xiyu Zhou, Shanghai (CN); Yi Li, Xi'an (CN); Guanglin Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/465,285

(22) PCT Filed: Mar. 16, 2017

(86) PCT No.: PCT/CN2017/076881
§ 371 (c)(1),
(2) Date: May 30, 2019

(87) PCT Pub. No.: WO2018/098930
PCT Pub. Date: Jun. 7, 2018

(65) Prior Publication Data
US 2019/0392785 A1    Dec. 26, 2019

(30) Foreign Application Priority Data
Nov. 30, 2016  (CN) .......................... 201611082255.2

(51) Int. Cl.
*G09G 5/34* (2006.01)
*G06F 16/51* (2019.01)
(Continued)

(52) U.S. Cl.
CPC ............. *G09G 5/34* (2013.01); *G06F 3/0485* (2013.01); *G06F 16/51* (2019.01); *G06F 16/54* (2019.01);
(Continued)

(58) Field of Classification Search
CPC ....................................................... G09G 5/34
(Continued)

(56) References Cited

U.S. PATENT DOCUMENTS 8,245,152 B2    8/2012  Brunner et al.
2006/0290688 A1*  12/2006  Chae .......................... G06T 3/60
                                                            345/204

(Continued)

FOREIGN PATENT DOCUMENTS

CN          101004672 A        7/2007
CN          101008956 A        8/2007
(Continued)

OTHER PUBLICATIONS

PCT International Search Report and Written Opinion issued in International Application No. PCT/CN2017/076881 dated Sep. 7, 2017, 16 pages (with English translation).
(Continued)

*Primary Examiner* — Shivang I Patel
(74) *Attorney, Agent, or Firm* — Maier & Maier, PLLC

(57) ABSTRACT

Example image display methods and apparatus are described. One example method includes generating a first image based on first user operation information. The first image is stored into a memory. When second user operation information is detected, the first image corresponding to the second user operation information is determined in the memory and based on the detected second user operation information. Both the first user operation information and the second user operation information are used for displaying the first image. The first image is displayed.

12 Claims, 3 Drawing Sheets

(51) Int. Cl.
  *G06F 16/54*    (2019.01)
  *G06F 3/0485*   (2013.01)
(52) U.S. Cl.
  CPC . *G09G 2340/0471* (2013.01); *G09G 2354/00* (2013.01)
(58) Field of Classification Search
  USPC ........................................................ 345/674
  See application file for complete search history.

(56) References Cited

U.S. PATENT DOCUMENTS

| | | |
|---|---|---|
| 2007/0211314 A1 | 9/2007 | Saito et al. |
| 2010/0293330 A1* | 11/2010 | Maloney ................ G06Q 10/10 711/118 |
| 2012/0144339 A1 | 6/2012 | Huang et al. |

FOREIGN PATENT DOCUMENTS

| | | |
|---|---|---|
| CN | 101136022 A | 3/2008 |
| CN | 101606144 A | 12/2009 |
| CN | 103714061 A | 4/2014 |
| CN | 105975170 A | 9/2016 |

OTHER PUBLICATIONS

Extended European Search Report issued in European Application No. 17876988.1 dated Sep. 18, 2019, 7 pages.

* cited by examiner

IMAGE DISPLAY METHOD, APPARATUS, AND TERMINAL DEVICE

CROSS-REFERENCE TO RELATED APPLICATIONS

This application is a National Stage of International Application No. PCT/CN2017/076881, filed Mar. 16, 2017, which claims priority to Chinese Patent Application No. 201611082255.2, filed on Nov. 30, 2016. Both of the aforementioned applications are hereby incorporated by reference in their entireties.

TECHNICAL FIELD

This application relates to the field of electronic devices, and more specifically, to an image display method and apparatus in the field of electronic devices.

BACKGROUND

With development of science and technology, a terminal device (Terminal Equipment), also referred to as user equipment (User Equipment, UE), usually has an image (such as window content) display function. In addition, user operation information (such as a sliding operation) is detected, so that an image corresponding to the user operation information is determined based on the detected user operation information, and the image is displayed within a corresponding window.

In the prior art, when user operation information is detected, and after an image corresponding to the user operation information is determined, the determined image is drawn, so that the drawn image is displayed within a corresponding window.

However, in the prior art, the image corresponding to the user operation information can be displayed only after the image is drawn. Consequently, a response speed of image display within the corresponding window is affected, and user experience is affected.

Therefore, a technology that enables a quick response of image display within a corresponding window when user operation information is detected is expected, thereby improving user experience.

SUMMARY

This application provides an image display method and apparatus, to implement a quick response of image display within a corresponding window when user operation information is detected.

According to a first aspect, an image display method is provided. The method includes: generating and displaying a first image based on first user operation information; storing the first image into a memory; when detecting second user operation information, determining, in the memory and based on the second user operation information, the first image corresponding to the second user operation information, where both the first user operation information and the second user operation information are used for displaying the first image; and displaying the first image.

Therefore, according to the image display method provided in this application, the first image generated based on the first user operation information is stored, and the generated first image is stored to the memory, so that the first image corresponding to the second user information may be determined in the memory and based on the second user operation information when the second user operation information is detected, the first image that needs to be displayed is captured from the memory (in other words, the first image does not need to be generated again), and the first image is displayed. In this way, a quick response of image display within a corresponding window is implemented, thereby improving user experience.

With reference to the first aspect, in a first implementation of the first aspect, the determining, in the memory and based on the second user operation information, the first image corresponding to the second user operation information includes: determining a first estimated storage location based on the second user operation information; and determining the first image in the memory based on the second user operation information when the first estimated storage location is within a storage location range of the memory.

Therefore, according to the image display method provided in this application, there is a correspondence between user operation information and a to-be-displayed image, so that when detecting the user operation information, a terminal device may determine, in the memory and based on the user operation information, a storage location of the to-be-displayed image corresponding to the user operation information, determine, based on the storage location, the to-be-displayed image that is in the memory and that is corresponding to the user operation information, capture the to-be-displayed image from the memory, and display the to-be-displayed image (in other words, the first image does not need to be generated again). In this way, a quick response of image display within a corresponding window is implemented, thereby improving user experience.

With reference to the first aspect and the foregoing implementation of the first aspect, in a second implementation of the first aspect, the memory includes an image browsed by a user within a first time period and an image browsed by the user within a second time period, and the second time period is prior to the first time period.

The image browsed by the user is stored, and the stored image not only includes an image currently being browsed by the user, but also includes a historical displayed image previously browsed by the user, so that displayed images stored in the memory are consecutive, and when detecting the user operation information, the terminal device may determine, in the consecutive displayed images stored in the memory, based on the user operation information, the to-be-displayed image corresponding to the user operation information. In this way, a quick response of image display within a corresponding window is implemented, thereby improving user experience.

With reference to the first aspect and the foregoing implementation of the first aspect, in a third implementation of the first aspect, an image corresponding to the first time period is an image currently being browsed by the user.

With reference to the first aspect and any one of the foregoing implementations of the first aspect, in a fourth implementation of the first aspect, the method further includes: forbidding generating an image based on the second user operation information.

For the first image that is already displayed and that is corresponding to the second user operation information, when the second user operation information is detected again, generating the first image based on the second user operation information is forbidden, in other words, an image corresponding to the second user operation information is directly captured, for display, from the images stored in the memory, thereby reducing a delay of man-machine interaction, and improving user experience.

With reference to the first aspect and any one of the foregoing implementations of the first aspect, in a fifth implementation of the first aspect, the user operation information includes sliding direction information of a sliding operation and sliding distance information of the sliding operation.

According to a second aspect, an image display apparatus is provided. The apparatus includes: a processing unit, configured to generate and display a first image based on first user operation information, where the processing unit is further configured to: store the first image into a memory; and the processing unit is further configured to: when detecting second user operation information, determine, in the memory and based on the second user operation information, the first image corresponding to the second user operation information, where both the first user operation information and the second user operation information are used for displaying the first image; and a display unit, configured to display the first image.

The first image generated based on the first user operation information is stored, and the generated first image is stored to the memory, so that the first image corresponding to the second user information may be determined in the memory and based on the second user operation information when the second user operation information is detected, and then the first image that needs to be displayed is captured from the memory (in other words, the first image does not need to be generated again), and the first image is displayed. In this way, a quick response of image display within a corresponding window is implemented, thereby improving user experience.

With reference to the second aspect, in a first implementation of the second aspect, the processing unit is further configured to: determine a first estimated storage location based on the second user operation information; and the processing unit is further configured to: determine the first image in the memory based on the second user operation information when the first estimated storage location is within a storage location range of the memory.

There is a correspondence between user operation information and a to-be-displayed image, so that when detecting the user operation information, a terminal device may determine, in the memory and based on the user operation information, a storage location of the to-be-displayed image corresponding to the user operation information, determine, in the memory and based on the storage location, the to-be-displayed image corresponding to the user operation information, capture the to-be-displayed image from the memory, and display the to-be-displayed image (in other words, the first image does not need to be generated again). In this way, a quick response of image display within a corresponding window is implemented, thereby improving user experience.

With reference to the second aspect and the foregoing implementation of the second aspect, in a second implementation of the second aspect, the memory includes an image browsed by a user within a first time period and an image browsed by the user within a second time period, and the second time period is prior to the first time period.

The image browsed by the user is stored, and the stored image not only includes an image currently being browsed by the user, but also includes a historical displayed image previously browsed by the user, so that displayed images stored in the memory are consecutive, and when detecting the user operation information, the terminal device may determine, in the consecutive displayed images stored in the memory, based on the user operation information, the to-be-displayed image corresponding to the user operation information. In this way, a quick response of image display within a corresponding window is implemented, thereby improving user experience.

With reference to the second aspect and the foregoing implementations of the second aspect, in a third implementation of the second aspect, an image corresponding to the first time period is an image currently being browsed by the user.

With reference to the second aspect and any one of the foregoing implementations of the second aspect, in a fourth implementation of the second aspect, the processing unit is further configured to: forbid generating an image based on the second user operation information.

For the first image that is already displayed and that is corresponding to the second user operation information, when the second user operation information is detected again, generating the image based on the second user operation information is forbidden, in other words, an image corresponding to the second user operation information is directly captured, for display, from the images stored in the memory, thereby reducing a delay of man-machine interaction, and improving user experience.

With reference to the second aspect and any one of the foregoing implementations of the second aspect, in a fifth implementation of the second aspect, the user operation information includes sliding direction information of a sliding operation and sliding distance information of the sliding operation.

According to a third aspect, an image display terminal device is provided. The terminal device includes: a memory, a processor, and a display, where the memory is configured to store an instruction; the processor is configured to invoke the instruction in the memory to perform the following step: generating and displaying, by the processor, a first image based on first user operation information; the processor is further configured to store the first image into the memory; the processor is further configured to: when detecting second user operation information, determine, in the memory and based on the second user operation information, the first image corresponding to the second user operation information, where both the first user operation information and the second user operation information are used for displaying the first image; and the display is configured to display the first image.

The first image generated based on the first user operation information is stored, and the generated first image is stored to the memory, so that the first image corresponding to the second user information may be determined in the memory and based on the second user operation information when the second user operation information is detected, and then the first image that needs to be displayed is captured from the memory (in other words, the first image does not need to be generated again), and the first image is displayed. In this way, a quick response of image display within a corresponding window is implemented, thereby improving user experience.

With reference to the third aspect, in a first implementation of the third aspect, the processor is further configured to: determine a first estimated storage location based on the second user operation information; and the processor is further configured to: determine the first image in the memory based on the second user operation information when the first estimated storage location is within a storage location range of the memory.

There is a correspondence between user operation information and a to-be-displayed image, so that when detecting the user operation information, a terminal device may determine, in the memory and based on the user operation information, a storage location of the to-be-displayed image corresponding to the user operation information, determine, in the memory and based on the storage location, the to-be-displayed image corresponding to the user operation information, capture the to-be-displayed image from the memory, and display the to-be-displayed image (in other words, the first image does not need to be generated again). In this way, a quick response of image display within a corresponding window is implemented, thereby improving user experience.

With reference to the third aspect and the foregoing implementation of the third aspect, in a second implementation of the third aspect, the memory includes an image browsed by a user within a first time period and an image browsed by the user within a second time period, and the second time period is prior to the first time period.

The image browsed by the user is stored, and the stored image not only includes an image currently being browsed by the user, but also includes a historical displayed image previously browsed by the user, so that displayed images stored in the memory are consecutive, and when detecting the user operation information, the terminal device may determine, in the consecutive displayed images stored in the memory, based on the user operation information, the to-be-displayed image corresponding to the user operation information. In this way, a quick response of image display within a corresponding window is implemented, thereby improving user experience.

With reference to the third aspect and the foregoing implementation of the third aspect, in a third implementation of the third aspect, an image corresponding to the first time period is an image currently being browsed by the user.

With reference to the third aspect and any one of the foregoing implementations of the third aspect, in a fourth implementation of the third aspect, the processor is further configured to: forbid generating an image based on the second user operation information.

For the first image that is already displayed and that is corresponding to the second user operation information, when the second user operation information is detected again, generating the image based on the second user operation information is forbidden, in other words, an image corresponding to the second user operation information is directly captured, for display, from the images stored in the memory, thereby reducing a delay of man-machine interaction, and improving user experience.

With reference to the third aspect and any one of the foregoing implementations of the third aspect, in a fifth implementation of the third aspect, the user operation information includes sliding direction information of a sliding operation and sliding distance information of the sliding operation.

According to a fourth aspect, a computer storage medium is provided. The computer storage medium stores program code. The program code is used for instructing to perform an operation of the image display method according to the first aspect or any optional implementation of the first aspect.

DESCRIPTION OF EMBODIMENTS

Technical solutions in this application may be applied to various terminal devices (also referred to as user equipments) that support image display, for example, a mobile phone device, a hand ring, a tablet computer, a notebook computer, an ultra-mobile personal computer (Ultra-Mobile Personal Computer, UMPC), a personal digital assistant (Personal Digital Assistant, PDA) device, a handheld device or a computing device having a wireless communications function, and another processing device, an in-vehicle device, a wearable device, or the like connected to a wireless modem, and the terminal devices are not limited to communications terminals.

Figure 1:
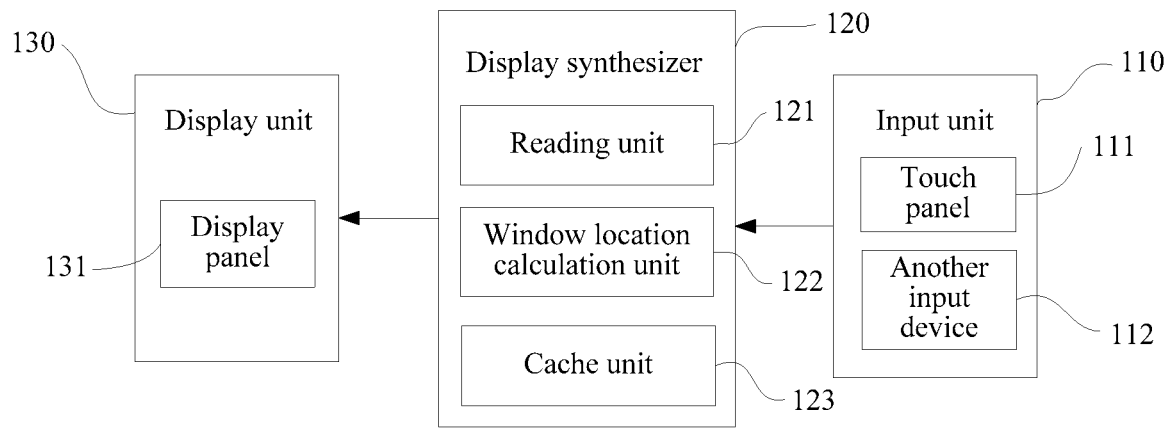
FIG. 1 is a schematic structural diagram of a display module of an image display terminal device according to this application.

FIG. 1 is a schematic structural diagram of a display module of an applicable terminal device according to this application. The display module may include parts such as an input unit 110, a display synthesizer 120, and a display unit 130.

A person skilled in the art may understand that, the structural diagram of the display module shown in FIG. 1 is only an example and does not constitute a limitation. The display module may further include parts more or fewer than those shown in the figure, or a different part configuration.

The input unit 110 may be configured to: receive input digit or character information, and generate a key signal related to a user setting and function control of the terminal device. Specifically, the input unit 110 may include a touch panel 111 and another input device 112. The touch panel 111, also referred to as a touchscreen, may collect a touch operation of a user on or near the touch panel 111 (such as an operation of the user on the touch panel 111 or near the touch panel 111 by using any suitable object or accessory such as a finger or a stylus), and drive a corresponding connection apparatus based on a preset program. The touch panel 111 may be implemented into touch panels of a plurality of types such as resistive, capacitive, infrared, and surface acoustic wave. In addition to the touch panel 111, the input unit 110 may further include the another input device 112. Specifically, the another input device 112 may include, but is not limited to, one or more of a physical keyboard, a functional key (such as a volume control key or a switch key), a trackball, a mouse, and a joystick.

The display unit 130 may be configured to display information entered by the user or information provided to the user, and various menus of the terminal device. The display unit 130 may include a display panel 131. Optionally, the display panel 131 may be configured in a form of a liquid crystal display unit (Liquid Crystal Display, LCD), an organic light-emitting diode (Organic Light-Emitting Diode, OLED), or the like. Further, the touch panel 111 may cover the display panel 131. After detecting the operation of the user on or near the touch panel 111, the touch panel 111 transfers information about the user operation to the display synthesizer 120. A reading unit 121 of the display synthesizer 120 obtains the information. A window location calculation unit 122 of the display synthesizer 120 determines, based on the user operation information obtained by the reading unit 121, whether the cache unit 123 includes an image corresponding to the user operation information. If the cache unit 123 includes the image corresponding to the user operation information, the display synthesizer 120 uses the display panel 131 in the display unit 130 to display the image corresponding to the user operation information in the cache unit 123.

The display panel 131 to which vision is output and that can be recognized by human eyes may serve as a display device in this application, to display text information or image information. In FIG. 1, the touch panel 111 and the display panel 131 implement, as two independent parts, input and output functions of the terminal device. However, in some embodiments, the touch panel 111 and the display panel 131 may be integrated to implement the input and output functions of the terminal device.

Currently, when the user performs an operation on the terminal device (for example, the operation is used to trigger the terminal device to display contact methods of a first contact to a ninth contact by using the display panel 131 in the display unit 130), the terminal device needs to draw display content triggered by the user operation, and display the display content by using the display panel 131 in the display unit 130 of the terminal device. When the user performs the same operation on the terminal device again (for example, the operation is also used to trigger the terminal device to display the contact methods of the first contact to the ninth contact by using the display panel 131 in the display unit 130), the terminal device still needs to draw the same display content again, and display the same display content by using the display panel 131 in the display unit 130. Therefore, the terminal device needs to repeatedly draw the same display content, and consequently the terminal device has a relatively slow response speed to the user operation.

For the foregoing problem existing in the prior art, this application provides a technical solution. A displayed image that has been browsed by the user is stored, so that when the user triggers the terminal device again to display the same displayed image, the terminal device does not need to store the same displayed image, directly captures a to-be-displayed image from stored images, and displays the to-be-displayed image by using a display.

Therefore, the technical solution provided in this application can support resolving the problem that the terminal device has a relatively slow response speed to a user operation. The following describes the technical solution in this application in detail.

Figure 2:
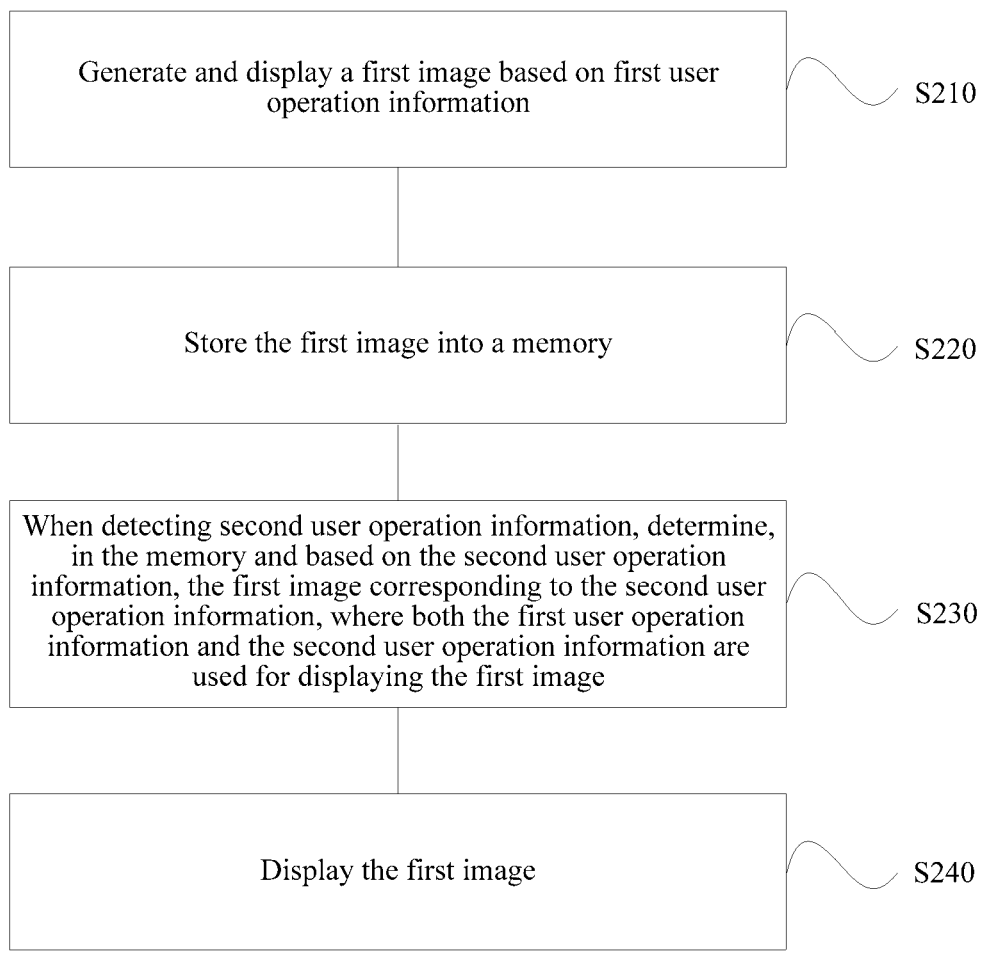
FIG. 2 is a schematic flowchart of an image display method according to this application.

FIG. 2 is a schematic flowchart of an image display method 200 according to an embodiment of the present invention. As shown in FIG. 2, the method 200 includes the following steps:

S210: Generate and display a first image based on first user operation information.

S220: Store the first image into a memory.

S230: When detecting second user operation information, determine, in the memory and based on the second user operation information, the first image corresponding to the second user operation information, where both the first user operation information and the second user operation information are used for displaying the first image.

S240: Display the first image.

The following describes the technical solution in this application by using an example in which the terminal device is a mobile phone device.

Specifically, in steps 210 and 210, a user opens instant messaging software (for example, WeChat) on a mobile phone device. The user opens a historical chat record with a friend in WeChat, and slides a finger on a mobile phone screen to browse chat content (for example, the first user operation information). In this case, an application process corresponding to WeChat needs to draw content currently being browsed by the user (for example, generate the first image), and display the drawn image by using a display panel 131 in a display unit 130 of the mobile phone device (namely, content that can be seen by the user on a display screen of the mobile phone).

In the technical solution in this application, after drawing and displaying the image, the mobile phone device stores the drawn image (for example, stores the first image into the memory), so that when the user subsequently needs to browse the same content again (for example, by using the second user operation information), the mobile phone device does not need to draw the displayed image again, but directly captures, from the memory, an image that needs to be displayed. In this way, a quick response of image display within a corresponding window is implemented, thereby improving user experience.

Optionally, the user operation information includes sliding direction information of a sliding operation and sliding distance information of the sliding operation.

In steps 220 and 230, when the mobile phone device detects the second user operation information (for example, the second user operation information is sliding operation information), the sliding operation may be the sliding of the user finger on the mobile phone screen (for example, a touch panel 111 in an input unit 110 of the terminal device). When detecting the sliding operation on the mobile phone screen, the mobile phone device may determine, in images stored in the memory and based on the sliding direction information of the sliding operation and the sliding distance information of the sliding operation, the first image corresponding to the second user operation information, and display the first image by using the display screen of the mobile phone device (for example, the display panel 131 in the display unit 130 of the terminal device).

For example, the second user operation information is that the user opens WeChat, and browses the same content of chat with the same friend in steps 210. In this case, in steps 210, the same chat content (for example, the first image) that is triggered by the first user operation information to be displayed is stored. Therefore, the displayed image (for example, the first image) corresponding to the second operation information may be directly determined in the memory, and the displayed image is captured from the memory and displayed.

Optionally, the determining, in the memory and based on the second user operation information, the first image corresponding to the second user operation information includes: determining a first estimated storage location based on the second user operation information; and determining the first image in the memory based on the second user operation information when the first estimated storage location is within a storage location range of the memory.

Optionally, the memory includes an image browsed by a user within a first time period and an image browsed by the user within a second time period, and the second time period is prior to or subsequent to the first time period.

Optionally, an image corresponding to the first time period is an image currently being browsed by the user.

It should be noted that, when an image is displayed on the display screen of the mobile phone device (for example, the display panel 131 in the display unit 130 of the terminal device), the displaying is performed by using the display screen of the mobile phone device as a unit, in other words, a window location calculation module 122 in a display synthesizer 120 determines, based on parameter information of the display screen of the mobile phone device, an amount of image data that needs to be displayed, where the parameter information may be size information of the display screen of the mobile phone device, then captures the corresponding image data from the memory (for example, a cache unit 123), and displays the corresponding image data by using the display panel 131 in the display unit 130.

The cache unit 123 stores image data corresponding to content that is browsed by the user after the user opens an application on the mobile phone device. For example, the user opens an address book on the mobile phone device for the first time, and when the user starts browsing from the first contact in the address book, the cache unit 123 caches image data that has been browsed by the user. For example, a picture of an image currently displayed on the display screen of the mobile phone device is phone numbers of the first contact to the ninth contact. After the image is drawn by an application process corresponding to the address book, the image is displayed by the display synthesizer 120 by using the display panel 131 in the display unit 130. After the picture of the image is drawn and displayed for the first time, the image data is cached into the cache unit 123. When the user subsequently continues to browse contacts in the address book, the cache unit stores the image data drawn and displayed for the first time, so that when the user needs to browse a contact that is already browsed, the image content does not need to be drawn again, and the display synthesizer 120 directly displays, from the cache unit, the image data by using the display panel 131 in the display unit 130. In this way, a quick response to a user operation is implemented.

For example, after the user opens the address book on the mobile phone device, the user is currently browsing a phone number of the fourteenth contact. All image data that is on the display screen of the mobile phone device and that is corresponding to the 14 contacts that have been browsed by the user are cached into the cache unit 123 after being drawn. In this case, when the user needs to slide upward on the display screen of the mobile phone device, to browse a phone number of the thirteenth contact, the application process corresponding to the address book does not need to draw the image data again. Instead, the window location calculation module 122 in the display synthesizer 120 needs to calculate a storage location of image data that is in the cache unit 123 and that is corresponding to sliding operation information of the user, and the display synthesizer 120 needs to display the image data corresponding to the storage location by using the display panel 131 in the display unit 130.

For example, a picture of an image currently displayed on the display screen of the mobile phone device is phone numbers of the second contact to the tenth contact. When the user needs to view a phone number of the thirteenth contact, the user slides a finger upward on the display screen of the mobile phone device. For example, the user slides the finger upward by 0.3 cm. The window location calculation module 122 determines through calculation, based on sliding operation information of the user, that image data corresponding to the sliding operation information of the user is stored at a storage location corresponding to the third byte to the twenty-second byte of a cache area, and then the display synthesizer 120 displays the image data by using the display panel 131 in the display unit 130.

Figure 3:
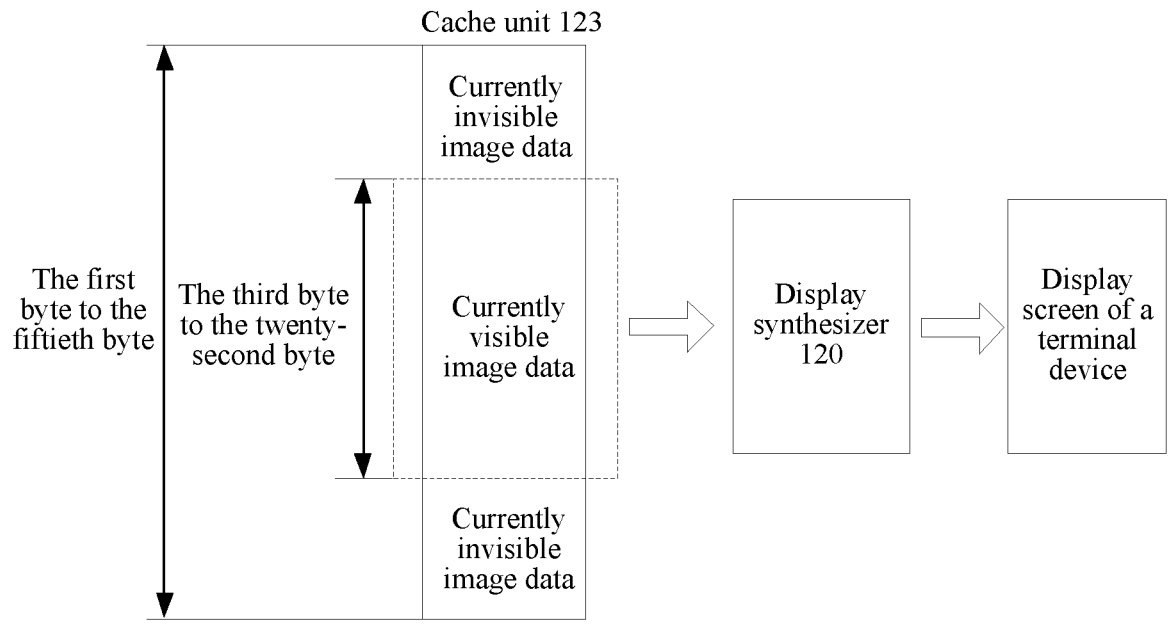
FIG. 3 is a schematic diagram of a storage structure of image data in a cache unit according to this application.

Based on the foregoing descriptions, it should be understood that, the image data stored in the cache unit 123 not only includes the picture of the image currently (for example, the first time period) displayed on the mobile phone device, but also includes image data stored before (for example, the second time period) the picture of the image that is currently displayed, and image data stored after (for example, the second time period) the picture of the image that is currently displayed. In other words, an amount of the image data stored in the cache unit 123 is far greater than that of the image currently displayed on the display screen of the mobile phone device. The image content directly captured from the cache unit 123 and displayed is referred to as "currently visible image data", as shown in FIG. 3. In other words, a current status is a state in which displaying is performed by using the display screen of the mobile phone device. In other words, the image content is image content currently visible to the user. A storage location of the "currently visible image data" in the cache unit 123 varies as the sliding operation information of the user changes. Other invisible image content in the cache unit 123 is referred to as "currently invisible image data". In other words, a storage location of this part of image content in the cache unit 123 is before or after a storage location of image data corresponding to currently visible window content, and this part of image content is displayed on the display screen of the mobile phone device as the sliding operation information of the user changes. When there is image data that is newly browsed by the user, the image data is sequentially stored into cache unit 123.

For example, for a mobile phone of a brand, a size of a screen of the mobile phone is 5.7 inches, and the display synthesizer 120 first determines that an amount of image data that needs to be displayed is 20 bytes, in other words, only image data not less than 20 bytes can cover the entire screen of the mobile phone.

Figure 4:
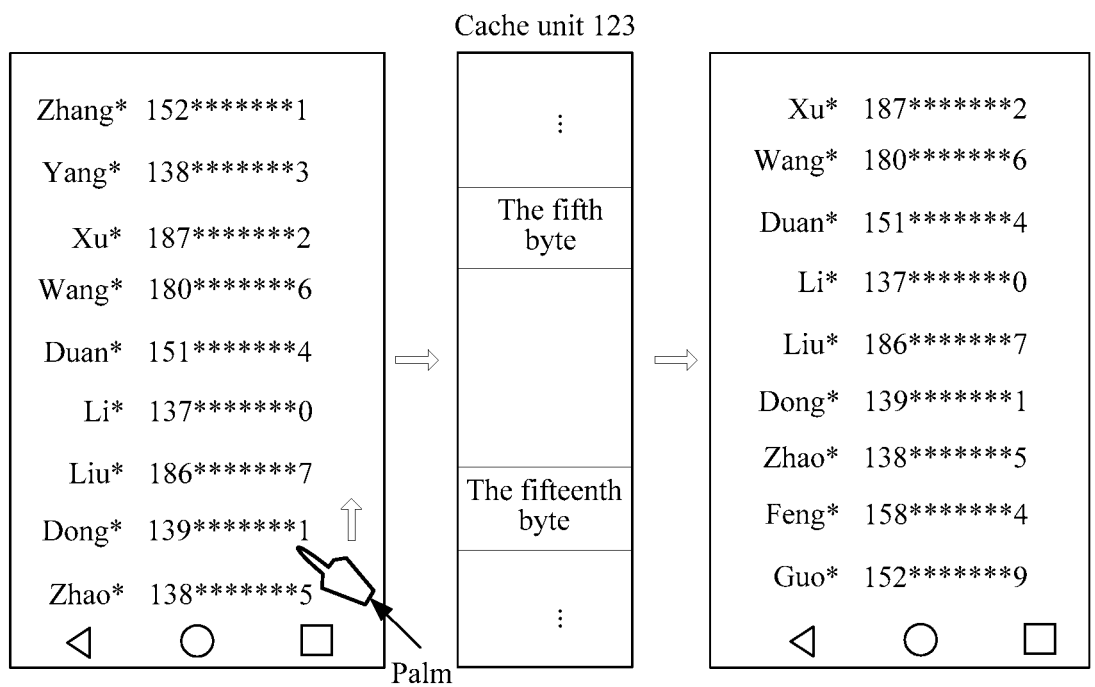
FIG. 4 is a schematic diagram of a status of interaction between a user and a mobile phone device.

The user currently browses phone numbers of the sixth contact to the fourteenth contact in the address book. In other words, an image currently displayed on the display screen of the mobile phone device is the phone numbers of the sixth contact to the fourteenth contact. As shown in FIG. 4, when the user needs to browse a phone number of the fourth contact, the user needs to slide a finger downward on the display screen of the mobile phone device. For example, the user slides the finger downward on the display screen of the mobile phone device by 0.5 cm.

The sliding operation information is first obtained by a reading module 121 in the display synthesizer 120 in the mobile phone device, and then the sliding operation information of the user is obtained, from the reading module 121, by the window location calculation module 122 in the display synthesizer 120. The window location calculation module 122 determines that the sliding information is sliding downward by 0.5 cm, further determines through calculation, based on the sliding operation information and with reference to the parameter information of the display screen of the mobile phone, that a storage location that is in the cache unit 123 and that is of image data corresponding to the sliding operation information is the fifth byte to the twenty-fourth byte, and when determining, based on the storage location, that the storage location does not exceed a maximum storage address in the cache unit 123, finally captures graphic data (namely, an image corresponding to the fourth contact to the twelfth contact) that is in the cache unit 123 and that is corresponding to the storage location, and displays the graphic data by using the display panel 131 in the display unit 130.

Optionally, generating an image based on the second user operation information is forbidden.

Specifically, when determining the storage location that is in the cache unit and that is of the image data corresponding to the sliding operation information of the user, and determining that the storage location does not exceed the maximum storage address in the cache unit 123, the window location calculation module 122 displays, by using the display panel 131 in the display unit 130, the graphic data that is in the cache unit 123 and that is corresponding to the storage location. At the same time, the application process corresponding to the address book is forbidden to draw the image content corresponding to the sliding operation information.

Optionally, when the cache unit 123 does not include an image corresponding to the second user operation information or includes a part of an image corresponding to the first user information, the image corresponding to the first user information is drawn by an application process triggered by the user, and the drawn image is displayed by using the display panel 131 in the display unit 130.

It should be noted that, for a case in which the cache unit 123 does not include the image corresponding to the second user operation information, there are mainly the following two reasons: An address of the storage location calculated by the window location calculation module exceeds the maximum storage address of the cache unit 123; or after opening an application, the user has not browsed corresponding content in the application, in other words, the cache unit 123 has not stored a displayed image browsed by the user.

For example, when the user needs to browse a phone number of the fifteenth contact, the user slides a finger upward on the display screen of the mobile phone device. For example, the user slides the finger upward on the display screen of the mobile phone device by 1 cm.

In this case, the sliding operation information is first obtained by the reading module 121 in the display synthesizer 120 in the mobile phone device, and then the sliding operation information of the user is obtained by the window location calculation module 122 in the display synthesizer 120 from the reading module 121. The window location calculation module 122 determines that the sliding information is sliding downward by 1 cm, further determines through calculation, based on the sliding operation information and with reference to the parameter information of the display screen of the mobile phone device, that a storage location that is in the cache unit 123 and that is of image data corresponding to the sliding operation information is the tenth byte to the twenty-ninth byte. For example, the cache unit currently caches only image data corresponding to the first byte to the twenty-fifth byte. In this case, image content corresponding to the twenty-sixth byte to the twenty-ninth byte needs to be displayed after being drawn by the application process corresponding to the address book, and the drawn and then displayed image data corresponding to the twenty-sixth byte to the twenty-ninth byte needs to be stored into the cache unit 123.

It should be understood that, the foregoing is merely an example of description, and does not constitute any limitation on this application.

The foregoing merely describes the technical solution in this application by using an example in which the terminal device is a mobile phone device.

The following describes the technical solution in this application by using an example in which the terminal device is a notebook computer.

When the user opens a Word document on the notebook computer to browse an academic paper, the user may browse content of the Word document by using another input device 112 of an input unit 110 of the notebook computer (for example, scrolling a computer mouse).

For example, the user currently browses text content of the first row to the twentieth row of the academic literature. When the user needs to browse content of the twentieth row to the fortieth row of the academic literature, the user needs to scroll the mouse of the notebook computer, or drag a progress bar of the Word document downward, to enable currently displayed content of the Word document to include the content of the twentieth row to the fortieth row of the academic literature.

The cache unit 123 in the notebook computer caches image data corresponding to literature content browsed by the user, so that when the user needs to browse again the literature content that is previously browsed, an application process corresponding to the Word document does not need to draw the image content again. Instead, the display synthesizer 120 directly displays, from the cache unit 123, the cached image data by using the display panel 131 in the display unit 130.

For example, the maximum storage address for caching in the cache unit 123 is the fiftieth byte, in other words, the first byte to the fiftieth byte in the cache unit 123 all store a picture of an image of literature content in browse history of the user.

For example, the user drags the progress bar of the Word document downward by 2 cm. The user operation information is first obtained by the reading module 121 in the display synthesizer 120 in the notebook computer, and then the sliding operation information of the user is obtained by the window location calculation module 122 in the display synthesizer 120 from the reading module 121. The window location calculation module 122 determines that the user operation information is that the progress bar is moved downward by 2 cm, further determines through calculation, based on the sliding operation information and with reference to the parameter information of the display screen of the notebook computer, that a storage location that is in the cache unit 123 and that is of image data corresponding to the user operation information is the fortieth byte to the sixtieth byte. The cache unit currently caches only image data corresponding to the first byte to the fiftieth byte. Therefore, in this case, image content corresponding to the fifty-first byte to the sixtieth byte needs to be displayed after being drawn by the application process corresponding to the Word document, and the drawn and then displayed image data corresponding to the fifty-first byte to the sixtieth byte needs to be stored into the cache unit 123.

When the cache unit 123 does not include image data of a to-be-displayed image or include a part of image data of a to-be-displayed image, an image that does not exist in the cache unit 123 needs to be drawn by using an application process opened by the user, and the drawn and displayed image is cached, in other words, the drawn and displayed image is sequentially stored into the cache unit additionally. In addition, the window location calculation module 122 determines a correspondence between image data stored in the cache unit 123 and user operation information. For example, when the user operation information is that the progress bar of the notebook computer is slid downward by 3 cm, the window location calculation module may determine, based on the user operation information, that image data corresponding to the user operation information is image data stored in the twentieth byte to the thirtieth byte in the cache unit 123.

It should be understood that, the user operation information listed in the foregoing is merely an example of description, and the present invention is not limited thereto. For example, the user operation information may further be pressing a button on the terminal device or slanting the terminal device by an angle relative to a horizontal surface. The present invention does not have any limitation on this.

According to the image display method in this application, the image displayed for the first time is cached, so that when the same user operation information triggers the image to be displayed again, the terminal device may directly capture, from the cache unit, the image that needs to be displayed, and does not need to draw the image before displaying the image. In this way, the quick response of the image display within the corresponding window may be implemented, thereby improving user experience.

In the foregoing, the image display method according to this application is described in detail with reference to FIG. 1 to FIG. 4. The following describes an image display apparatus according to this application in detail with reference to FIG. 5.

Figure 5:
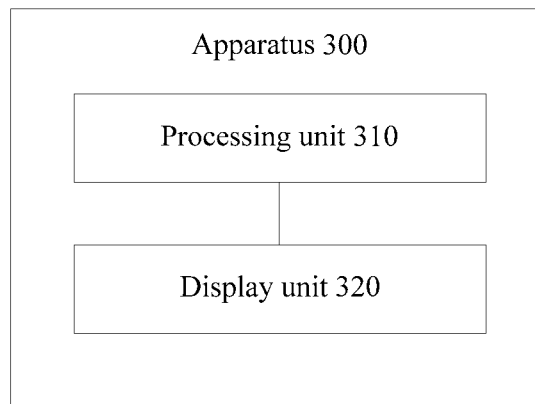
FIG. 5 is a schematic block diagram of an image display apparatus according to this application.

FIG. 5 is a schematic block diagram of an image display apparatus 300 according to this application. As shown in FIG. 5, the apparatus 300 includes a processing unit 310 and a display unit 320.

The processing unit 310 is configured to generate and display a first image based on first user operation information.

The processing unit 310 is further configured to store the first image into the memory.

The processing unit 310 is further configured to: when detecting second user operation information, determine, in the memory and based on the second user operation information, the first image corresponding to the second user operation information, where both the first user operation information and the second user operation information are used for displaying the first image.

The display unit 320 is configured to display the first image.

Optionally, the processing unit 310 is further configured to:
the determining, in the memory and based on the second user operation information, the first image corresponding to the second user operation information includes: determining a first estimated storage location based on the second user operation information; and determining the first image in the memory based on the second user operation information when the first estimated storage location is within a storage location range of the memory.

Optionally, the memory includes an image browsed by a user within a first time period and an image browsed by the user within a second time period, and the second time period is prior to the first time period.

Optionally, an image corresponding to the first time period is an image currently being browsed by the user.

Optionally, the processing unit 310 is further configured to:
forbid generating an image based on the second user operation information.

Optionally, the user operation information includes sliding direction information of a sliding operation and sliding distance information of the sliding operation.

The image display apparatus 300 according to this application may correspond to an implementation body for the image display method 200 according to this application, and the units in the image display apparatus 300 and the foregoing other operations and/or functions are respectively intended to implement the corresponding procedures of the method 200 in FIG. 2. For brevity, details are not described herein.

According to the image display apparatus in this application, the image displayed for the first time is cached, so that when the same user operation information triggers the image to be displayed again, the terminal device may directly capture, from the cache unit, the image that needs to be displayed, and does not need to draw the image before displaying the image. In this way, a quick response of image display within a corresponding window may be implemented, thereby improving user experience.

In the foregoing, the image display method according to this application is described in detail with reference to FIG. 1 to FIG. 4. The following describes an image display device according to this application in detail with reference to FIG. 6.

Figure 6:
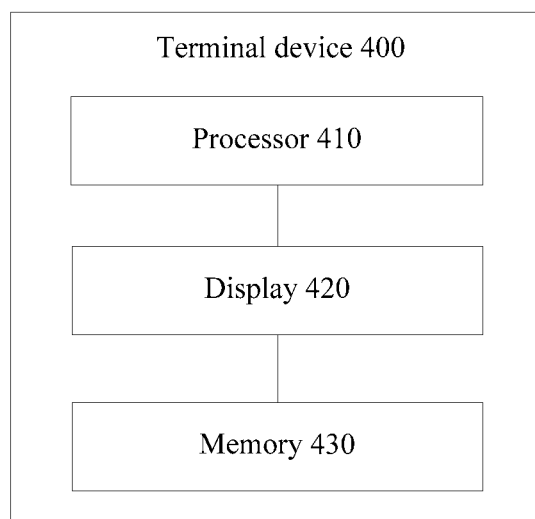
FIG. 6 is a schematic structural diagram of an image display terminal device according to this application.

FIG. 6 is a schematic block diagram of a terminal device 400 according to this application. As shown in FIG. 6, the terminal device 400 includes a processor 410, a display 420, and a memory 430.

The memory 430 is configured to store an instruction. The processor 410 is configured to execute the instruction stored in the memory 430, to control the display 420 to display an image.

The memory 430 may include a volatile memory (volatile memory), for example, a random access memory (random-access memory, RAM). The memory may alternatively include a non-volatile memory (non-volatile memory), for example, a flash memory (flash memory), a hard disk drive (hard disk drive, HDD), or a solid-state drive (solid-state drive, SSD). The memory 430 may alternatively include a combination of the foregoing types of memories.

The processor 410 may be a central processing unit (central processing unit, CPU), a network processor (network processor, NP), or a combination of a CPU and an NP. The processor 410 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable logic gate array (field-programmable gate array, FPGA), a generic array logic (generic array logic, GAL), or any combination thereof.

The processor 410 is configured to generate and display a first image based on first user operation information.

The processor 410 is further configured to store the first image into the memory.

The processor 410 is further configured to: when detecting second user operation information, determine, in the memory and based on the second user operation information, the first image corresponding to the second user operation information, where both the first user operation information and the second user operation information are used for displaying the first image.

The display 420 is configured to display the first image.
Optionally, the processor 410 is further configured to:
the determining, in the memory and based on the second user operation information, the first image corresponding to the second user operation information includes: determining a first estimated storage location based on the second user operation information; and determining the first image in the memory based on the second user operation information when the first estimated storage location is within a storage location range of the memory.

Optionally, the memory includes an image browsed by a user within a first time period and an image browsed by the user within a second time period, and the second time period is prior to the first time period.

Optionally, an image corresponding to the first time period is an image currently being browsed by the user.

Optionally, the processor 410 is further configured to:

forbid generating an image based on the second user operation information.

Optionally, the user operation information includes sliding direction information of a sliding operation and sliding distance information of the sliding operation.

The terminal device 400 according to this application may correspond to an implementation body for the image display method 200 according to this application, and the units in the terminal device 400 and the foregoing other operations and/or functions are respectively intended to implement the corresponding procedures of the method 200 in FIG. 2. For brevity, details are not described herein.

According to the image display terminal device in this application, the image displayed for the first time is cached, so that when the same user operation information triggers the image to be displayed again, the terminal device may directly capture, from the cache unit, the image that needs to be displayed, and does not need to draw the image before displaying the image. In this way, a quick response of image display within a corresponding window may be implemented, thereby improving user experience.

It should be understood that sequence numbers of the foregoing processes do not mean execution sequences in various embodiments of this application. The execution sequences of the processes should be determined according to functions and internal logic of the processes, and should not be construed as any limitation on the implementation processes of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image display method, wherein the method comprises:

generating a first image based on first user operation information;

storing the first image into a memory;

in response to detecting second user operation information, determining, in the memory and based on the second user operation information, the first image corresponding to the second user operation information, wherein both the first user operation information and the second user operation information are used for displaying the first image; and displaying the first image, wherein the user operation information comprises sliding direction information of a sliding operation and sliding distance information of the sliding operation, wherein the determining of the first image corresponding to the second user operation information is further based on a size of a display window screen, the sliding direction information of the second user operation information, and the sliding distance information of the second user operation information.

2. The method according to claim 1, wherein the determining, in the memory and based on the second user operation information, the first image corresponding to the second user operation information comprises:

determining a first estimated storage location based on the second user operation information; and determining the first image in the memory based on the second user operation information in response to determining that the first estimated storage location is within a storage location range of the memory.

3. The method according to claim 1, wherein the memory comprises an image browsed by a user within a first time period and an image browsed by the user within a second time period, and wherein the second time period is prior to the first time period.

4. The method according to claim 3, wherein an image corresponding to the first time period is an image currently being browsed by the user.

5. The method according to claim 1, wherein the method further comprises:
forbidding generating an image based on the second user operation information.

6. The method according to claim 1, wherein an amount of image data corresponding to the first image is calculated based on the size of the display window screen, the sliding direction information of the second user operation information, and the sliding distance information of the second user operation information.

7. An image display terminal device, the image display terminal device comprising: a memory, at least one processor, and a display, wherein:
the memory is configured to store an instruction;
the at least one processor is configured to execute the instruction in the memory to perform the following steps:
generating a first image based on first user operation information;
storing the first image into the memory; and
in response to detecting second user operation information, determining, in the memory and based on the second user operation information, the first image corresponding to the second user operation information, wherein both the first user operation information and the second user operation information are used for displaying the first image; and
the display is configured to display the first image, wherein the user operation information comprises sliding direction information of a sliding operation and sliding distance information of the sliding operation,
wherein the determining of the first image corresponding to the second user operation information is further based on a size of a display window screen, the sliding direction information of the second user operation information, and the sliding distance information of the second user operation information.

8. The terminal device according to claim 7, wherein the at least one processor is further configured to execute the instruction in the memory to perform the following steps:
determining a first estimated storage location based on the second user operation information; and
determining the first image in the memory based on the second user operation information in response to determining that the first estimated storage location is within a storage location range of the memory.

9. The terminal device according to claim 7, wherein the memory comprises an image browsed by a user within a first time period and an image browsed by the user within a second time period, and wherein the second time period is prior to the first time period.

10. The terminal device according to claim 9, wherein an image corresponding to the first time period is an image currently being browsed by the user.

11. The terminal device according to claim 7, wherein the at least one processor is further configured to execute the instruction in the memory to perform the following step:
forbidding generating an image based on the second user operation information.

12. The terminal device according to claim 7, wherein an amount of image data corresponding to the first image is calculated based on the size of the display window screen, the sliding direction information of the second user operation information, and the sliding distance information of the second user operation information.

* * * * *